(12) United States Patent
Shiota et al.

(10) Patent No.: US 10,897,549 B2
(45) Date of Patent: Jan. 19, 2021

(54) MEDIUM TRANSPORT APPARATUS, IMAGE READING APPARATUS, AND TRANSPORT CONTROL METHOD

(71) Applicant: SEIKO EPSON CORPORATION, Tokyo (JP)

(72) Inventors: Takayuki Shiota, Kitakyushu (JP); Ryoichi Hirayama, Kitakyushu (JP); Kazuhiko Arimori, Kitakyushu (JP); Seiji Eguchi, Kitakyushu (JP); Masahiko Mizoguchi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/696,277

(22) Filed: Nov. 26, 2019

(65) Prior Publication Data
US 2020/0177751 A1 Jun. 4, 2020

(30) Foreign Application Priority Data
Nov. 30, 2018 (JP) .................. 2018-225037

(51) Int. Cl.
*H04N 1/00* (2006.01)
*B65H 5/06* (2006.01)
*B65H 7/02* (2006.01)

(52) U.S. Cl.
CPC ......... *H04N 1/00721* (2013.01); *B65H 5/062* (2013.01); *B65H 7/02* (2013.01); *H04N 1/00713* (2013.01); *H04N 1/00809* (2013.01)

(58) Field of Classification Search
None
See application file for complete search history.

(56) References Cited

U.S. PATENT DOCUMENTS

| 5,719,968 | A | * | 2/1998 | Hashimoto | H04N 1/3875 358/449 |
| 10,097,712 | B2 | * | 10/2018 | Rokuhara | H04N 1/00748 |
| 10,322,898 | B2 | * | 6/2019 | Kogi | B65H 7/02 |
| 10,659,642 | B2 | * | 5/2020 | Masaru | H04N 1/00732 |
| 10,717,617 | B2 | * | 7/2020 | Miyagawa | B65H 5/062 |

(Continued)

FOREIGN PATENT DOCUMENTS

| JP | S57169767 | 10/1982 |
| JP | H09027888 | 1/1997 |

(Continued)

*Primary Examiner* — Anh-Vinh T Nguyen
(74) *Attorney, Agent, or Firm* — Workman Nydegger

(57) ABSTRACT

A medium transport apparatus includes: a feed unit feeds a medium to a transport direction; a first detection unit disposed upstream of the feed unit, and detects movement of the fed medium; a second detection unit disposed downstream of the first detection unit and detects an inclination of the medium; and a control unit detects the inclination of the medium based on a signal of the second detection unit and stop transfer of the medium when the inclination exceeds a threshold value, and the plurality of the threshold values have a relationship such that when a medium length in the transport direction is a second length being shorter than a first length, a relatively higher value is produced than in a case in which the medium length is the first length, and the control unit selects a threshold value based on a detection value of the first detection unit.

6 Claims, 10 Drawing Sheets

(56) References Cited

U.S. PATENT DOCUMENTS

| | | | |
|---|---|---|---|
| 2002/0075527 A1* | 6/2002 | Ito | H04N 1/00005 358/496 |
| 2006/0159471 A1 | 7/2006 | Yasukawa et al. | |
| 2007/0237558 A1 | 10/2007 | Nakanishi et al. | |
| 2008/0265497 A1* | 10/2008 | Kimura | B65H 3/063 271/228 |
| 2010/0052237 A1* | 3/2010 | Herczeg | G07F 19/20 271/3.16 |
| 2010/0098471 A1* | 4/2010 | Satoh | G03G 15/6567 399/361 |
| 2011/0128526 A1* | 6/2011 | Nireki | G07D 7/12 356/71 |
| 2013/0036886 A1* | 2/2013 | Kato | B65H 7/10 83/73 |
| 2013/0256986 A1* | 10/2013 | Umeno | B65H 7/06 271/228 |
| 2017/0094086 A1* | 3/2017 | Nomoto | H04N 1/58 |
| 2019/0100396 A1* | 4/2019 | Shiota | B65H 3/5284 |
| 2019/0281171 A1* | 9/2019 | Hayashi | H04N 1/387 |
| 2020/0145547 A1* | 5/2020 | Kitsuki | H04N 1/00615 |
| 2020/0177751 A1* | 6/2020 | Shiota | B65H 5/062 |
| 2020/0201232 A1* | 6/2020 | Umi | G03G 15/6567 |

FOREIGN PATENT DOCUMENTS

| | | |
|---|---|---|
| JP | 2003205654 | 7/2003 |
| JP | 2006193286 | 7/2006 |
| JP | 2007276982 | 10/2007 |
| JP | 2019029794 | 2/2019 |

* cited by examiner

MEDIUM TRANSPORT APPARATUS, IMAGE READING APPARATUS, AND TRANSPORT CONTROL METHOD

The present application is based on, and claims priority from JP Application Serial Number 2018-225037, filed Nov. 30, 2018, the disclosure of which is hereby incorporated by reference herein in its entirety.

BACKGROUND

1. Technical Field

The present disclosure relates to a medium transport apparatus that transports a medium and an image reading apparatus including the medium transport apparatus. The present disclosure also relates to a transport control method in a medium transport apparatus.

2. Related Art

To date, a method of detecting a skew of a medium and performing predetermined control has been used in image reading apparatuses and recording apparatuses. For example, JP-A-9-27888 discloses an image reading apparatus configured to detect a skew (oblique motion) of a document using a CCD and perform error processing when a skew amount exceeds a preset reference value.

When a skew amount exceeds a reference value, there are cases where transport may be continued without change depending on the document size. For example, in the case of a document having a small size, even when the document is transported in a skewed state, the edges of the document do not come into contact with the corresponding side walls of a transport path, or the document does not get deformed to cause a jam even when the document came into contact. It is also possible to correct the inclination of an image by software processing. Accordingly, the convenience of a user will be impaired when error processing is uniformly performed in such a case.

SUMMARY

According to an aspect of the present disclosure, there is provided a medium transport apparatus including: a feed unit configured to feed a medium to a transport direction; a first detection unit disposed upstream of the feed unit and facing a face of the medium to be transported to the transport direction, and configured to detect movement of the medium to be fed downstream by the feed unit; a second detection unit disposed downstream of the first detection unit and configured to detect an inclination of the medium; and a control unit configured to detect an inclination of the medium based on a signal received from the second detection unit and stop transfer of the medium when the inclination exceeds a threshold value, wherein a plurality of the threshold values are set, and the plurality of the threshold values have a relationship such that when a medium length in the transport direction is a second length being shorter than a first length, a relatively higher value is produced than in a case in which the medium length is the first length, and the control unit selects any one of the plurality of threshold values based on a detection value of the first detection unit.

DESCRIPTION OF EXEMPLARY EMBODIMENTS

Figure 1:
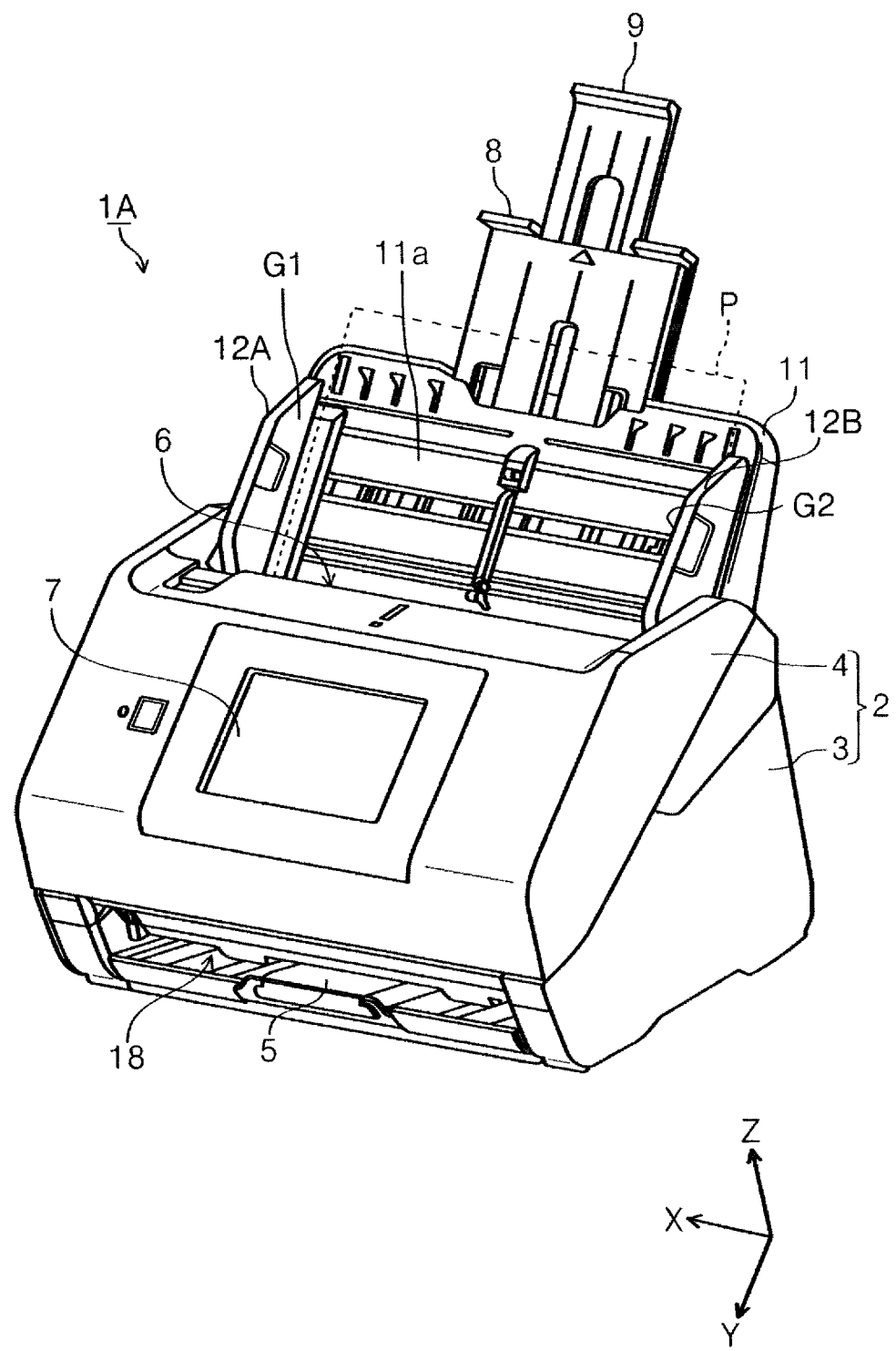
FIG. 1 is an outer perspective view of a scanner.

In the following, a schematic description will be given of the present disclosure. According to a first aspect, there is provided a medium transport apparatus including: a feed unit configured to feed a medium to a transport direction; a first detection unit disposed upstream of the feed unit and facing a face of the medium to be transported to the transport direction, and configured to detect movement of the medium to be fed downstream by the feed unit; a second detection unit disposed downstream of the first detection unit and configured to detect an inclination of the medium; and a control unit configured to detect an inclination of the medium based on a signal received from the second detection unit and stop transfer of the medium when the inclination exceeds a threshold value, wherein a plurality of the threshold values are set, and the plurality of the threshold values have a relationship such that when a medium length in the transport direction is a second length being shorter than a first length, a relatively higher value is produced than in a case in which the medium length is the first length, and the control unit selects any one of the plurality of threshold values based on a detection value of the first detection unit.

With this aspect, at the time of performing control of stopping the transfer of the medium when the inclination of the medium exceeds a threshold value, a plurality of the threshold values are set, and the plurality of the threshold values have a relationship such that when a medium length in the transport direction is a second length being shorter than a first length, a relatively higher value is produced than in a case in which the medium length is the first length, and the control unit selects any one of the plurality of threshold values based on a detection value of the first detection unit. That is to say, the control unit obtains the medium length of the transport direction or information related to that by using the first detection unit, and selects a threshold value in accordance with that. Accordingly, it is possible to avoid stopping transfer even when there is little possibility of causing a transport abnormality and to improve the user convenience. In this regard, "a threshold value is high" means that further inclination of the medium is permitted.

According to a second aspect, in the first aspect, when the second detection unit detects an inclination of a medium front end, in a case in which a medium back end has not passed a detection position of the first detection unit, the control unit may select a tentative threshold value independent of the medium length.

With this aspect, when the second detection unit detects an inclination of a medium front end, in a case in which a medium back end has not passed a detection position of the first detection unit, the control unit selects a tentative threshold value that does not depend on the medium length. Accordingly, it is possible to determine a transport abnormality in the state of before obtaining the medium length in the transport direction.

According to a third aspect, in the second aspect, a plurality of the tentative threshold values may be set, and the plurality of the tentative threshold values may have a relationship such that a higher value is produced when the medium length in a width direction intersecting the transport direction is relatively short. With this aspect, a plurality of the tentative threshold values may be set, and the plurality of the tentative threshold values may have a relationship so as to be higher when the medium length in a direction intersecting the transport direction is relatively short. Accordingly, it is possible to avoid stopping transport in the case of having a low possibility of the occurrence of a transport abnormality, and thus to improve the user convenience. In this regard, "tentative threshold value is high when the medium length in the width direction is relatively short" means, for example, in a relationship between a third medium and a fourth medium having a shorter medium length in the width direction than, a threshold value applied to the fourth medium is higher than a threshold value applied to the third medium. This means that the higher the threshold value, the further inclination of the medium is permitted.

According to a fourth aspect, in any one of the first to the third aspects, the first detection unit may be a two-dimensional sensor that detects movement of the medium in a two-dimensional coordinate system including a first axis and a second axis. With this aspect, the first detection unit is a two-dimensional sensor that detects movement of the medium in a two-dimensional coordinate system including a first axis and a second axis. Accordingly, it is possible to suitably detect movement of the medium in the transport direction.

According to a fifth aspect, there is provided an image reading apparatus including: a reading unit configured to read a medium; and the medium transport apparatus configured to transport the medium to the reading unit, according to any one of the first aspect to the fourth aspect. With this aspect, it is possible to obtain operational advantages of any one of the first aspect to the fourth aspect described above.

According to a sixth aspect, there is provided a method of controlling a medium transport apparatus including a feed unit configured to feed a medium to a transport direction, a first detection unit disposed upstream of the feed unit and facing a face of the medium to be transported to the transport direction, and configured to detect movement of the medium to be fed downstream by the feed unit, and a second detection unit disposed downstream of the first detection unit and configured to detect an inclination of the medium, the method including: a plurality of the threshold values being set for an inclination of the medium, and the plurality of the threshold values have a relationship such that when a medium length in the transport direction is a second length being shorter than a first length, a relatively higher value is produced than in a case in which the medium length is the first length, and selecting any one of the plurality of threshold values based on a detection value of the first detection unit; detecting an inclination of the medium based on a signal received from the second detection unit; and when the inclination exceeds a threshold value, stopping transfer of the medium.

With this aspect, at the time of performing control on transfer of a medium when the inclination of the medium exceeds a threshold value, a plurality of the threshold values are set for the inclination of the medium, and the plurality of the threshold values have a relationship such that when a medium length in the transport direction is a second length being shorter than a first length, a relatively higher value is produced than in a case in which the medium length is the first length. The control unit selects any one of the plurality of the threshold values based on the detection value of the first detection unit, that is to say, using the first detection unit, the control unit obtains the medium length of the transport direction or the information related to thereof, and selects a threshold value in accordance with the information. Accordingly, it is possible to avoid stopping transfer even when there is little possibility of causing a transport abnormality and to improve the user convenience. In this regard, "a threshold value is high" means that a further inclination of the medium is permitted.

In the following, the present disclosure will be specifically described. A description will be given of an image reading apparatus according to an embodiment with reference to the drawings. In the present embodiment, as an example of the image reading apparatus, a description will be given of a document scanner (hereinafter simply referred to as a scanner LA) configured to read at least one of the front face and the back face of a document P.

In this regard, in the X-Y-Z coordinate system illustrated in each diagram, the X-direction is the width direction of the apparatus and is also the document width direction, which intersects the document transport direction. Also, the Y-direction is the document transport direction. The Z-direction is the direction that intersects the Y-direction and roughly indicates the direction perpendicular to the face of the document P to be transported. Also, it is assumed that +Y-direction is the direction heading from the back face to the front face of the apparatus, and −Y-direction is the direction heading from the front face to the back face of the apparatus. Also, it is assumed that the left direction seen from the apparatus front face is +X-direction, and the right direction is −X-direction. Also, it is assumed that +Z-direction is the up direction of the apparatus, and −Z-direction is the down direction of the apparatus. Also, it is assumed that the direction (+Y-direction) in which the document P is transported is referred to as "downstream" and the opposite direction (−Y-direction) to this is referred to as "upstream".

FIG. 1 is an outer perspective view of the scanner 1A according to the present disclosure. The scanner 1A includes an apparatus body 2 that includes a reader 20 (FIG. 2) for reading an image of the document P. The apparatus body 2 includes a lower unit 3 and an upper unit 4. The upper unit 4 is disposed so as to be openable and closable with respect to the lower unit 3 with a downstream point in the document transport direction as a rotation fulcrum. It is possible to open the upper unit 4 by rotating the upper unit 4 in the front face direction of the apparatus and to expose the document transport path of the document P so as to easily handle the jam of the document P.

A document mounting section 11 having a mounting face 11a on which the document P to be fed is mounted is disposed close to the apparatus back face of the apparatus body 2. The document mounting section 11 is detachably disposed with respect to the apparatus body 2. Also, the document mounting section 11 is provided with a pair of edge guides, specifically, a first edge guide 12A and a second edge guide 12B that guide the side edges of the document P in the width direction (X-axis direction) of the feed direction (Y-axis direction) of the document P. The first edge guide 12A and the second edge guide 12B include guide faces G1 and G2 respectively that guide the corresponding side edges of the document P.

The document mounting section 11 includes a first paper support 8 and a second paper support 9. It is possible to store the first paper support 8 and the second paper support 9 inside the document mounting section 11, to pull out the first paper support 8 and the second paper support 9 from the document mounting section 11 as illustrated in FIG. 1, and to adjust the length of the mounting face 11*a*.

The apparatus body 2 includes, on the apparatus front face of the upper unit 4, an operation panel 7 that enables a user interface (UI) by which various reading settings and reading operations are performed and reading setting contents, and the like are displayed. In the present embodiment, the operation panel 7 is a so-called touch panel that enables both display and input operations. The operation panel 7 serves both an operation section for performing various operations and a display section for displaying various kinds of information. A feed opening 6 that connects to the inside of the apparatus body 2 is disposed at the upper part of the upper unit 4, and the document P mounted on the document mounting section 11 is transported from the feed opening 6 to the reader 20 disposed inside the apparatus body 2. Also, a paper discharge tray 5 that receives the discharged document P is disposed on the apparatus front face of the lower unit 3.

Figure 2:
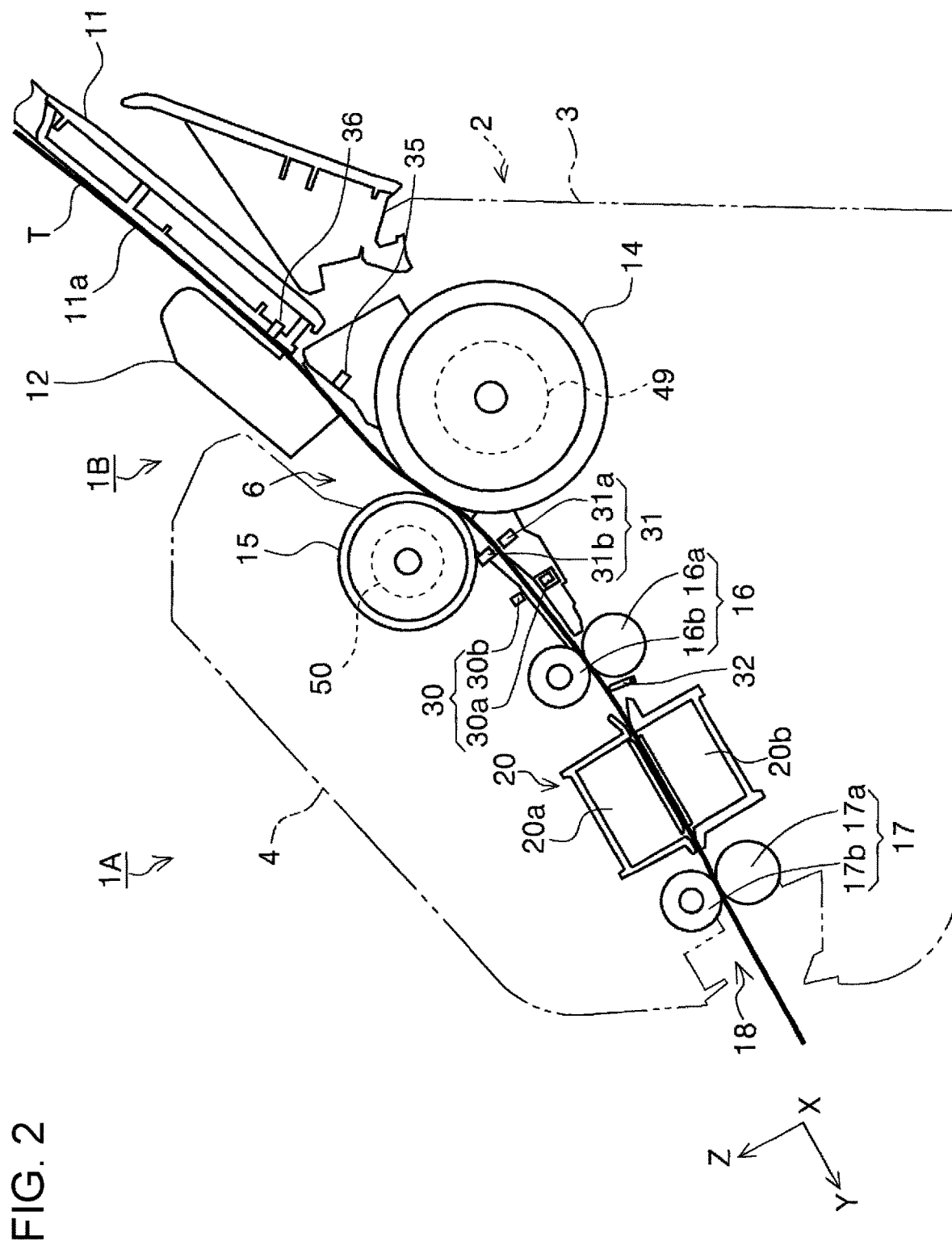
FIG. 2 is a sectional side view illustrating a document transport path in the scanner.
Figure 3:
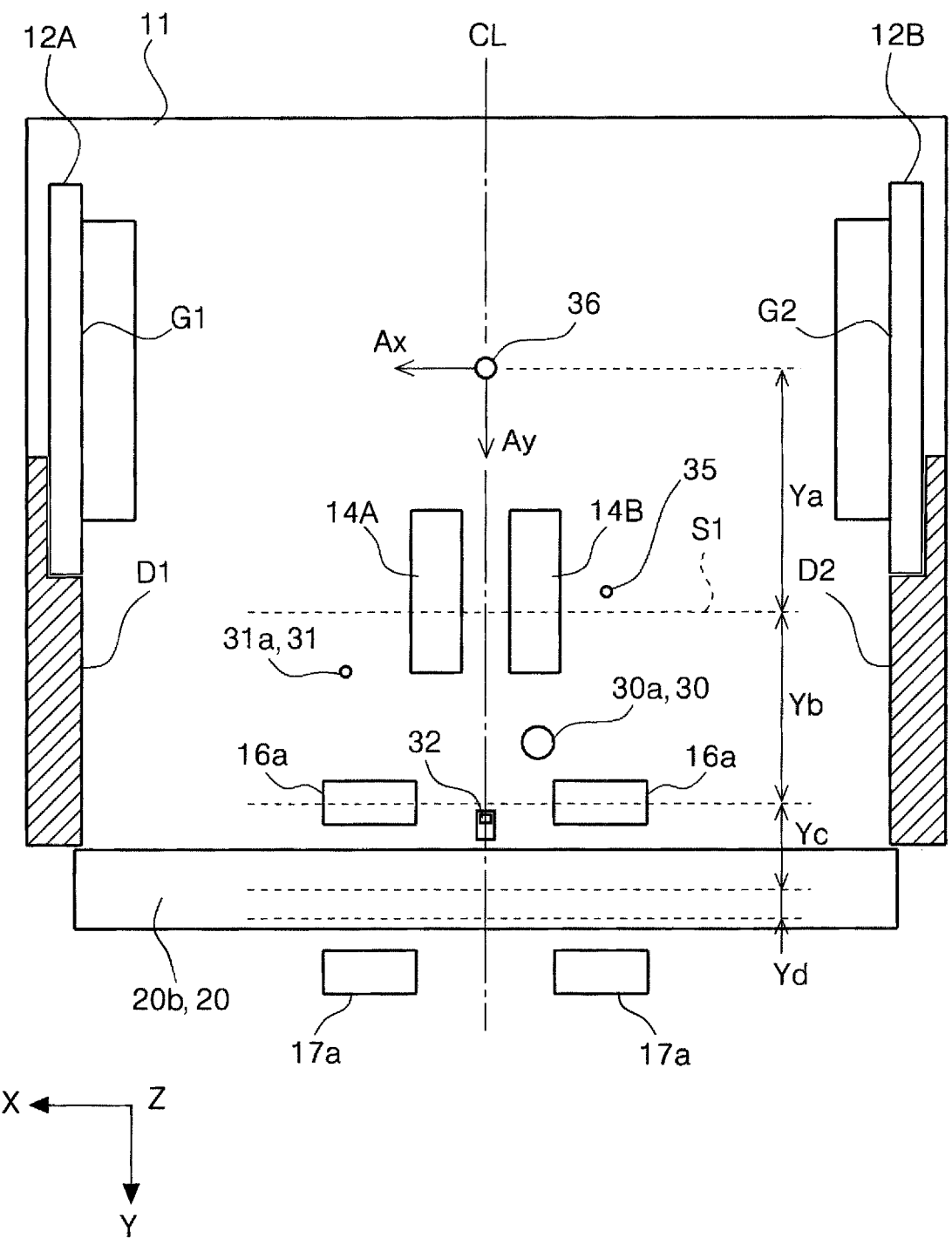
FIG. 3 is a plan view illustrating the document transport path in the scanner.

Next, a description will be given of the document feed path in the scanner 1A mainly with reference to FIG. 2 and FIG. 3. FIG. 2 is a sectional side view illustrating the document feed path in the scanner 1A according to the present disclosure, and FIG. 3 is a plan view thereof. The scanner 1A includes a medium transport apparatus 1B (FIG. 2). The medium transport apparatus 1B is considered to be an apparatus produced by removing a document reading function, specifically, a reader 20 described later from the scanner 1A. However, even in the case of including the reader 20, when focus is given to a viewpoint of document transport, it is possible to consider the scanner 1A itself as a medium transport apparatus. A sign T denoted by a solid line in FIG. 2 indicates the document feed path, in other words, the passing locus of the document P. The document feed path T is a space sandwiched by the lower unit 3 and the upper unit 4.

The uppermost stream of the document feed path T is provided with the document mounting section 11. The downstream of the document mounting section 11 is provided with a feed roller 14 that transports the document P mounted on the mounting face 11*a* of the document mounting section 11 to the reader 20 and a separation roller 15 that nips and separates the document P from the feed roller 14. A pair of the feed roller 14 and the separation roller 15 becomes an example of feed unit that feed the document P downstream.

The feed roller 14 comes in contact with the lowermost part of the document P mounted on the mounting face 11*a* of the document mounting section 11. Accordingly, when a plurality of sheets of the document P is set in the document mounting section 11 in the scanner 1A, a sheet of the document P on the side of the mounting face 11*a* is fed downstream in order.

As illustrated in FIG. 3, in the present embodiment, the feed roller 14 includes two rollers such that the rollers are line symmetrical with respect to a center position CL in the document width direction. In FIG. 3, the feed roller 14 on the left side of the center position CL is denoted by a sign 14A, and the feed roller 14 on the right side of the center position CL is denoted by a sign 14B. Although illustration is omitted in FIG. 3, in the same manner, the separation roller 15 also includes two rollers such that the rollers are line symmetrical with respect to the center position CL.

In this regard, the above-described first edge guide 12A and the second edge guide 12B are disposed at the left side and the right side respectively of the center position CL in the document width direction. In the present embodiment, the first edge guide 12A and the second edge guide 12B are configured to be displaced at respective positions that are always line symmetrical with respect to the center position CL by a rack and pinion mechanism not illustrated in the figure. It is also possible to hold the displaced positions by a holding unit not illustrated in the figure, for example, by a friction member or a serrated engagement unit. In FIG. 3, signs D1 and D2 are respective guide faces of the path member forming the end portions of the medium feed path T in the medium width direction. In the present embodiment, the distance from the center position CL to the guide face D1 is the same as the distance from the center position CL to the guide face D2. In the present embodiment, when the gap between the first edge guide 12A and the second edge guide 12B is expanded most, the guide face G1 becomes substantially flush with the guide face D1, and the guide face G2 becomes substantially flush with the guide face D2.

In the present embodiment, the state in which the gap between the first edge guide 12A and the second edge guide 12B is expanded most is the state in which the gap between the guide face G1 and the guide face G2 becomes larger than the short side size of the document P that is assumed to have the largest size in designing the apparatus. In this regard, in the present embodiment, the largest document P assumed in designing the apparatus is the letter size. The letter size is a letter size defined by ANSI (American National Standards Institute) A and has a short side of 216 mm and a long side of 279 mm. In the present embodiment, the gap between the first edge guide 12A and the second edge guide 12B when the edge guide 12 is at the maximum guide position is set to 225 mm. Accordingly, the gap between the guide face D1 and the guide face D2 also becomes 225 mm. In this regard, instead of the letter size, the A4 size defined by ISO (International Organization for Standardization) 216 may be used as the largest document P assumed in designing the apparatus. The A4 size paper has a short side of 210 mm and a long side of 297 mm. Also, the A3 size document has a short side of 297 mm and a long side of 420 mm. When the largest document P assumed in designing the apparatus is the A3 size, it is possible to set the gap between both of the edge guides when the gap between the first edge guide 12A and the second edge guide 12B is expanded most to, for example, 307 mm.

Also, a broken line S1 in FIG. 3 illustrates the front end position of the document P mounted on the document mounting section 11 before starting the feed operation. The front end of the document P mounted on the document mounting section 11 is regulated by a regulation member not illustrated in the figure so that the front end position is located at the position S1. When the feed operation is started, the regulation member moves to a retreat position.

Figure 4:
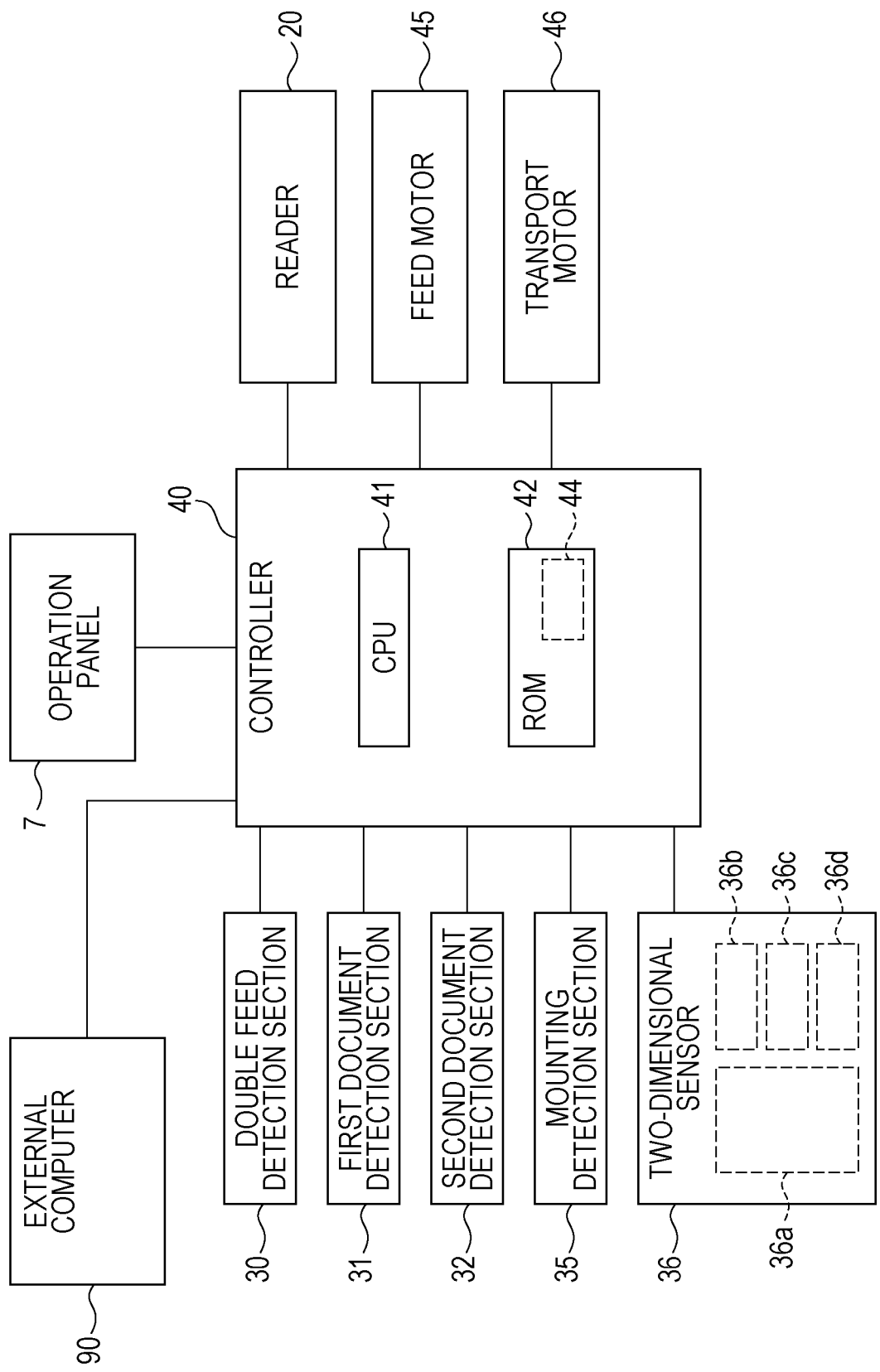
FIG. 4 is a block diagram illustrating a control system of the scanner.

The feed roller 14 is rotary driven by a feed motor 45 (FIG. 4). The feed roller 14 is rotated counterclockwise in FIG. 2 by being applied a rotational torque by the feed motor 45. A driving force of the feed motor 45 is transmitted to the feed roller 14 via a one-way clutch 49. The feed roller 14 is applied with a rotational torque from the feed motor 45 and is rotated counter clockwise in FIG. 2, that is to say, is rotated in a positive rotational direction so that the document P is fed downstream.

The driving force transmission path between the feed roller 14 and the feed motor 45 (FIG. 4) is provided with the one-way clutch 49, and thus when the feed motor 45 is reversely rotated, the feed roller 14 is not reversely rotated. Also, in the state in which the feed motor 45 is stopped, it is possible for the feed roller 14 to keep in contact with the document P transported, and to be rotated in the positive rotational direction. For example, when the front end of the document P is detected by a second document detection section 32 disposed downstream of a pair of transport rollers 16, the controller 40 stops driving of the feed motor 45 and drives only the transport motor 46. Thereby, the document P is transported by the pair of transport rollers 16, and the feed roller 14 is driven in positive rotational direction by keeping in contact with the document P.

Next, a transport motor 46 (FIG. 4) transmits a rotational torque to the separation roller 15 via a torque limiter 50. During the feed operation of the document P, the transport motor 46 (FIG. 4) transmits a drive torque to the separation roller 15 so as to rotate the separation roller 15 in the reverse rotational direction (counterclockwise in FIG. 2).

When the document P does not exist between the feed roller 14 and the separation roller 15, or when only one sheet lies therebetween, the rotational torque that causes the separation roller 15 to rotate in the positive rotational direction (clockwise in FIG. 2) exceeds the limit torque of the torque limiter 50. Thereby, a slip occurs in the torque limiter 50 so that the separation roller 15 is rotationally driven in the positive rotational direction in spite of the rotational torque applied from the transport motor 46 (FIG. 4).

In contrast, when the second and later sheet of the document P are further caught between the feed roller 14 and the separation roller 15 in addition to a sheet of the document P to be fed, a slip occurs among the sheets of the document. Thereby, the separation roller 15 is reversely rotated by the drive torque applied from the transport motor 46 (FIG. 4). Thereby, the second and later sheets of the document P to be doubly fed are returned upstream, that is to say, double feed of the document P is prevented.

In this regard, the outer circumference surfaces of the feed roller 14 and the separation roller 15 are formed by an elastic material, such as an elastomer, or the like. Assuming that the friction factor between the feed roller 14 and the separation roller 15 is $\mu1$, the friction factor between the documents is $\mu2$, the friction factor between the feed roller 14 and the document P is $\mu3$, and the friction factor between the separation roller 15 and the document P is $\mu4$, a relational expression $\mu1 > \mu2$ holds. Also, a relational expression $\mu1 > \mu3$ and $\mu4$ holds. Also, a relational expression $\mu2 < \mu3$ and $\mu4$ holds. Also, a relational expression $\mu4 > \mu3$ holds.

The downstream of the feed roller 14 is provided with the pair of transport rollers 16 as a feed unit, the reader 20 that reads an image, and a pair of discharge rollers 17. The pair of transport rollers 16 includes a transport drive roller 16a that is rotary driven by the transport roller motor 46 (FIG. 4) as a transport motor, and a transport driven roller 16b that is rotary driven. In the present embodiment, as illustrated in FIG. 3, the transport drive roller 16a includes two rollers such that the rollers are line symmetrical with respect to the center position CL. Although the transport driven roller 16b is omitted in FIG. 3, the transport driven roller 16b also includes two rollers such that the rollers are line symmetrical with respect to the center position CL in the same manner. The document P that has been nipped by the feed roller 14 and the separation roller 15, and has been fed downstream is nipped by the pair of transport rollers 16, and is transported to the reader 20 located downstream of the pair of transport rollers 16. That is to say, the pair of transport rollers 16 becomes an example of the feed unit that feeds the document P downstream.

The reader 20 includes an upper part reading sensor 20a disposed on the upper unit 4 and a lower part reading sensor 20b disposed on the lower unit 3. In the present embodiment, the upper part reading sensor 20a and the lower part reading sensor 20b includes a contact-type image sensor module (CISM), for example.

The image of at least one of the front face and the back face of the document P is read by the reader 20, is nipped by the pair of discharge rollers 17 located downstream of the reader 20, and is discharged from a discharge opening 18 disposed on the apparatus front face of the lower unit 3. The pair of discharge rollers 17 includes a discharge drive roller 17a rotary driven by the transport roller motor 46 (FIG. 4) and a discharge driven roller 17b that is rotary driven. In the present embodiment, as illustrated in FIG. 3, the discharge drive roller 17a includes two rollers such that the rollers are line symmetrical with respect to the center position CL. Although not illustrated in FIG. 3, the discharge driven roller 17b also includes two rollers such that the rollers are line symmetrical with respect to the center position CL in the same manner. The pair of discharge rollers 17 becomes an example of the feed unit that feeds the document P downstream.

In the following, a description will be given of the control system in the scanner 1A with reference to FIG. 4. FIG. 4 is a block diagram illustrating the control system of the scanner 1A according to the present disclosure. In FIG. 4, as the control unit, the controller 40 performs feed, transport, discharge control of the document P and read control in addition to the other various kinds of control of the scanner 1A. The controller 40 receives a signal input from the operation panel 7. The controller 40 also transmits a signal for realizing display of the operation panel 7 and particularly the user interface (UI) to the operation panel 7.

The controller 40 controls the feed motor 45 and the transport motor 46. As described above, the feed motor 45 is the drive source of the feed roller 14 illustrated in FIG. 2, and the transport motor 46 is the drive source of the separation roller 15, the pair of transport rollers 16, and the pair of discharge rollers 17 illustrated in FIG. 2. Both the feed motor 45 and the transport motor 46 are DC motors in the present embodiment. The controller 40 receives input of read data from the reader 20, and the controller 40 also transmits a signal for controlling the reader 20 to the reader 20. In this regard, the controller 40 detects the inclination of the document P based on the read data from the reader 20. Accordingly, the reader 20 functions as the second detection unit for detecting the inclination of the document P. The controller 40 also receives signals from the detection units, such as a mounting detection section 35 described later, a two-dimensional sensors 36, a double feed detection section 30, a first document detection section 31, and a second document detection section 32. The controller 40 also receives input of the detection values of an encoder that detects the rotation amount of the feed motor 45 and an encoder that detects the rotation amounts of the transport drive roller 16a and the discharge drive roller 17a. Thereby, it is possible for the controller 40 to detect the amount of document transport by each of the rollers.

The controller 40 includes a CPU 41 and a flash ROM 42. The CPU 41 performs various operation processing in accordance with a program 44 stored in the flash ROM 42 to control the operation of the entire scanner 1A. In this regard, the flash ROM 42, which is an example of a storage section, is a nonvolatile memory capable of reading and writing, and stores necessary data for abnormality determination, and the like. In this specification, unless otherwise described in particular, it is assumed that necessary data for abnormality determination described later, necessary parameter for control, and the like are all stored in the flash ROM 42, and the values thereof are updated by the controller 40 as necessary. Also, various kinds of setting information input by a user via the operation panel 7 is also stored in the flash ROM 42. The program 44 stored in the flash ROM 42 does not necessarily mean one program, and includes a plurality of programs. The programs include a program for determining abnormality in the document feed path T, a program for changing threshold values described later, a program for controlling the UI displayed on the operation panel 7, various control programs necessary for transporting and reading the document P, and the like.

Also, the scanner 1A is configured to connect to an external computer 90, and the controller 40 receives input of information from the external computer 90. The external computer 90 includes a display section not illustrated in FIG. 4. On the display section, a user interface (UI) is realized by a control program stored in a storage unit included in the external computer 90, which is not illustrated in FIG. 4.

Next, a description will be given of each detection unit disposed on the document feed path T. First, a two-dimensional sensor 36 is disposed on the document mounting section 11. The two-dimensional sensor 36 is facing the lowest sheet of the document P mounted on the document mounting section 11. The two-dimensional sensor 36 is a sensor that is based on the same or a similar principle as a sensor configured to detect movement of a detection object on a two-dimensional (plane) coordinate system, which is used by a computer mouse. The two-dimensional sensor 36 includes a controller 36a, a light source 36b, a lens 36c, and an image sensor 36d. The light source 36b is a light source for irradiating the document P mounted on the document mounting section 11 with light via the lens 36c, and it is possible to employ a light source, for example, a red LED, an infrared LED, laser, a blue LED, and the like. In the present embodiment, laser light is used. The lens 36c guides the light emitted from the light source 36b to the document P mounted on the document mounting section 11.

The image sensor 36d is a sensor that receives reflected light from the document P mounted on the document mounting section 11, and may be an image sensor, such as a CMOS, a CCD, or the like. The image sensor 36d includes an array of pixels arranged in a first axis Ax direction and a second axis Ay direction perpendicular to the first axis Ax direction. In this regard, in the present specification, the "first axis Ax direction" does not mean either one of +Ax direction or −Ax direction, but means including the both directions. In the same manner, "second axis Ay direction" does not mean either one of +Ay direction or −Ay direction, but means including both of the directions. The controller 36a analyzes an image obtained by the image sensor 36d and outputs the movement distance Wx of the image in the first axis Ax direction and the movement distance Wy in the second axis Ay direction as detection values (output values). It is possible to use a publicly known method for the image analysis method performed by the controller 36a.

Although more specific description will be given later, the controller 40 obtains detection values in the first axis Ax direction and the second axis Ay direction from the two-dimensional sensor 36. The controller 40 determines the transport state of a sheet of the document P that is mounted on the lowest position on the document mounting section 11 and in process of being transported using the obtained detection values. In this regard, the two-dimensional sensor 36 according to the present embodiment outputs respective movement distances Wx and Wy in the first axis Ax direction and the second axis Ay direction to the controller 40. The output values are reset to zero by an initialization instruction output by the controller 40.

In this regard, the description has been given of the two-dimensional sensor 36 that is configured to use an optical method as an example. However, the sensor may be configured to use a mechanical method, and more specifically, a mechanical sensor may be used that includes a track ball, a rotary encoder for detecting the rotation of the track ball in the first axis Ax direction, and a rotary encoder for detecting the rotation of the track ball in the second axis Ay direction.

Next, a mounting detection section 35 for detecting whether or not the document P exists on the document mounting section 11 is disposed downstream of the two-dimensional sensor 36. The mounting detection section 35 includes a light source and a sensor that receives the reflected light component of the light emitted from the light source. It is possible for the controller 40 to detect existence of the document P on the document mounting section 11 by the difference between the intensities of the reflected light when the document P exists on the document mounting section 11 and when the document P does not exist.

A first document detection section 31 is disposed downstream of the feed roller 14. The first document detection section 31 includes an optical sensor as an example, and includes a light emitter 31a and a light receiver 31b that are disposed facing each other by sandwiching the document feed path T as illustrated in FIG. 2. The light receiver 31b transmits an electronic signal indicating the intensity of detection light to the controller 40 (FIG. 4). The transported document P blocks the detection light emitted from the light emitter 31a so that an electronic signal indicating the intensity of the detection light changes. Thereby it is possible for the controller 40 (FIG. 4) to detect the passing of the front end or the back end of the document P.

A double feed detection section 30 that detects double feed of the document P is disposed downstream of the first document detection section 31. As illustrated in FIG. 2, the double feed detection section 30 includes an ultrasonic transmitter 30a and an ultrasonic receiver 30b for receiving an ultrasonic wave, which are disposed facing each other by sandwiching the document feed path T. The ultrasonic receiver 30b transmits an output value in accordance with the intensity of the detected ultrasonic wave to the controller 40. When double feed of the document P occurs, the electronic signal indicating the intensity of the ultrasonic wave changes, and thereby, it is possible for the controller 40 to detect double feed of the document P.

A second document detection section 32 is disposed downstream of the double feed detection section 30. The second document detection section 32 is configured as a contact type sensor having a lever. When the lever is rotated by the document P passing the front end or the back end, the electronic signal transmitted from the second document detection section 32 to the controller 40 changes. Thereby, it is possible for the controller 40 to detect the document P passing the front end or the back end. It is possible for the controller 40 to obtain the position of the document P in the document feed path T by the first document detection section 31 and the second document detection section 32 described above.

Next, a description will be given of abnormality determination on transport of the document P using the two-dimensional sensor 36 and the reader 20. The scanner 1A according to the present embodiment performs abnormality determination on transport of the document P based on the detection values of the two-dimensional sensor 36. When a predetermined condition is satisfied, transport of the document P is stopped because of the occurrence of an abnormality. In the embodiment, specifically, the feed motor 45 (FIG. 4) and the transport motor 46 (FIG. 4) are stopped. As described above, the two-dimensional sensor 36 includes an image sensor 36d including an array of pixels arranged in a first axis Ax direction and a second axis Ay direction perpendicular to the first axis Ax direction. As illustrated in FIG. 3, the first axis Ax is disposed in the X direction, and the second axis Ay is disposed in the Y direction. In the present embodiment, the controller 40 obtains the transport direction length of the document P based on the detection value Wy in the second axis Ay direction, received from the two-dimensional sensor 36, which will be described later in detail.

In this regard, in FIG. 3, a distance Ya is a Y-direction distance between the document detection position by the two-dimensional sensor 36 and the position S1, a distance Yb is a Y-direction distance between the position S1 and a document nipping position by the pair of transport rollers 16, and a distance Yc is a Y-direction distance between the document nipping position by the pair of transport rollers 16 and a document reading line by the reader 20. Also, a distance Yd is a Y-direction distance of an image reading range necessary for the reader 20 to detect the inclination of the document front end.

Figure 7:
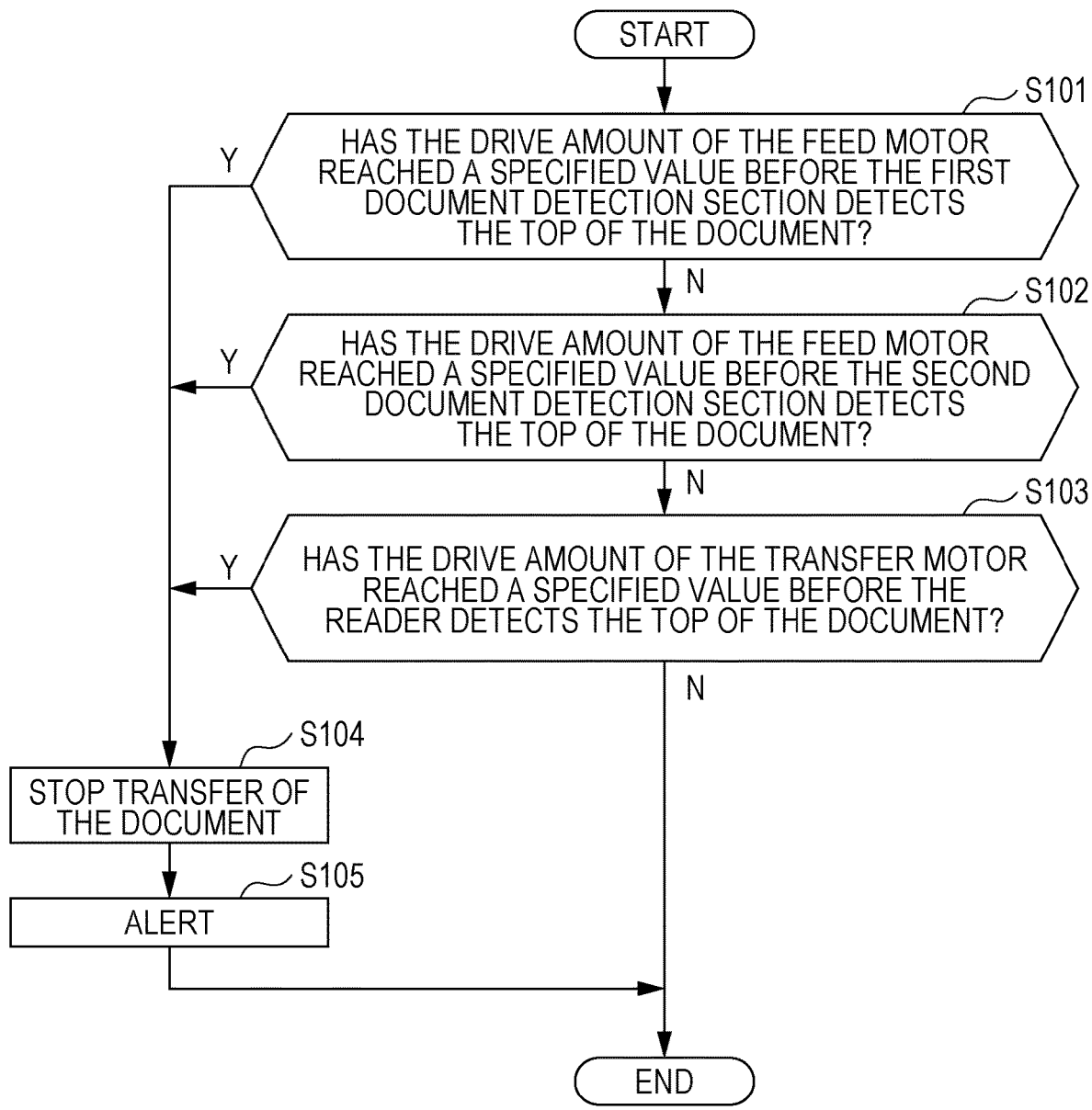
FIG. 7 is a flowchart of abnormality determination processing at the time of scanning a document.

First, a description will be given of transfer stop control based on jam determination, which is an example of a transport abnormality with reference to FIG. 7. In this regard, in the present embodiment, when the execution of scan operation is started, the controller 40 performs transfer stop control based on the jam determination illustrated in FIG. 7. Next, the controller 40 performs transfer stop control based on skew determination, which will be described later with reference to FIG. 8. In the following, a description will be first given of transfer stop control based on jam determination. When a document scan operation is started, the controller 40 determines whether or not the drive amount of the feed motor 45 has reached a specified value before the first document detection section 31 detects the document top (step S101). When the drive amount of the feed motor 45 has reached the specified value before the first document detection section 31 detects the document top (Yes in step S101), the controller 40 determines that a jam has occurred, stops transfer of the document P (step S104), and issues an alert stating the occurrence of a transport abnormality (step S105). In this regard, the specified value of the drive amount of the feed motor 45 in step S101 is a value produced by providing the drive amount of the feed motor 45 at the time of feeding the document P from the position S1 in FIG. 3 to the first document detection section 31 with a certain amount of allowance.

Next, when the result is No in step S101, that is to say, when the first document detection section 31 detects the document top before the drive amount of the feed motor 45 reaches the specified value, the controller 40 determines whether or not the drive amount of the feed motor 45 has reached a specified value before the second document detection section 32 detects the document top (step S102). When the drive amount of the feed motor 45 has reached the specified value (Yes in step S102) before the second document detection section 32 detects the document top, the controller 40 determines that a jam has occurred and stops transfer of the document P (step S104), and issues an alert stating that a transport abnormality has occurred (step S105). In this regard, the specified value of the drive amount of the feed motor 45 in step S102 is a value produced by providing the drive amount of the feed motor 45 at the time of feeding the document P from the first document detection section 31 to the second document detection section 32 with a certain amount of allowance.

Next, when the second document detection section 32 detects the document top before the drive amount of the feed motor 45 reaches the specified value (Yes in step S102), the controller 40 determines whether or not the drive amount of the transport motor 46 has reached a specified value before the reader 20 detects the document top (step S103). When the drive amount of the transport motor 46 has reached the specified value before the reader 20 detects the document top (Yes in step S103), the controller 40 determines that a jam has occurred, stops transfer of the document P (step S104), and issues an alert stating that a transport abnormality has occurred (step S105). In this regard, the specified value of the drive amount of the transport motor 46 in step S103 is a value produced by providing the drive amount of the feed motor 46 at the time of feeding the document P from the second document detection section 32 to the reading line by the reader 20 with a certain amount of allowance.

Next, a description will be given of transfer stop control based on the determination of a skew, which is an example of transport abnormality, with reference to FIG. 8. When the document scan operation is started, the controller 40 sets the movement distance Wy in the second axis Ay direction of two-dimensional sensor 36 to zero (step S201). Next, when the document top reaches the reader 20, and the reader 20 detects an inclination of the document top (Yes in step S202), the controller 40 determines whether or not an increase has stopped in the detection value in the second axis Ay direction by the two-dimensional sensor 36 before the reader 20 detects an inclination of the document (step S203). The case in which an increase of the detection value in the second axis Ay direction by the two-dimensional sensor 36 has stopped means that the document back end has passed the detection position of the two-dimensional sensor 36. Accordingly, the case in which an increase of detection value in the second axis Ay direction by the two-dimensional sensor 36 has stopped before the reader 20 detects an inclination of the document top means that the transport direction length L of the document P is less than the distance [Ya+Yb+Yc+Yd] in FIG. 3.

When an increase of the detection value in the second axis Ay direction by the two-dimensional sensor 36 has stopped before the reader 20 detects an inclination of the document top (Yes in step S203)), the controller 40 calculates the document length L (step S207) and selects an inclination threshold value in accordance with the document length L (step S208). A detailed description will be given of the selection of an inclination threshold value in accordance with the document length L. The calculation method of the document length L differs when the branch result differs in step S203. When the processing proceeds to step S207 by Yes in the branch of step S203, an increase of the detection value in second axis Ay direction by the two-dimensional sensor 36 is stopped before the reader 20 detects an inclination of the top of the document. Accordingly, the sum of a document transport amount Yt at the time of stopping an increase of the detection value in the second axis Ay direction by the two-dimensional sensor 36 and the distance Ya (FIG. 3) becomes the document length L. The document transport amount Yt corresponds to the amount of advancement downstream of the document top from the position S1 in FIG. 3.

When the document inclination angle is equal to or higher than the threshold value selected based on the document length (Yes in step S209), the controller 40 determines that a transport abnormality, such as a jam, or the like occurs by the continuation of the transport, stops the transfer of the document P (step S210), and issues an alert stating the occurrence of a transport abnormality (step S211).

On the other hand, in a case in which an increase of the detection value in the second axis Ay direction by the two-dimensional sensor 36 has not been stopped at the point in time when the reader 20 has detected an inclination of the document top (No in step S203), the controller 40 selects a tentative threshold value (step S204) and determines whether or not the inclination angle of the document is equal to or higher than the tentative threshold value (step S205). As a result, when the inclination angle of the document is equal to or higher than the tentative threshold value (Yes in step S205), the controller 40 determines that a transport abnormality, such as a jam, or the like occurs when the controller 40 continues the transport and stops transfer of the document P (step S210), and issues an alert stating that (step S211).

When the document inclination angle is less than the tentative threshold value (No in step S205), the controller 40 continues determining whether or not the document inclination angle is equal to or higher than the threshold value until an increase of the movement distance Wy in the second axis Ay direction by the two-dimensional sensor 36 stops (No in step S206 and step S205). When an increase of the movement distance Wy in the second axis Ay direction stops, that is to say, when the document back end has passed the detection position by the two-dimensional sensor 36, the controller 40 executes the above-described step S207 and after that. In this regard, in this case, the sum of a document transport amount Ys, from the point in time when the reader 20 has detected the inclination angle of the document top to the time when an increase of the detection value in the second axis Ay direction by the two-dimensional sensor 36 stops, and a distance [Ya+Yb+Yc+Yd] becomes the document length L.

Figure 5:
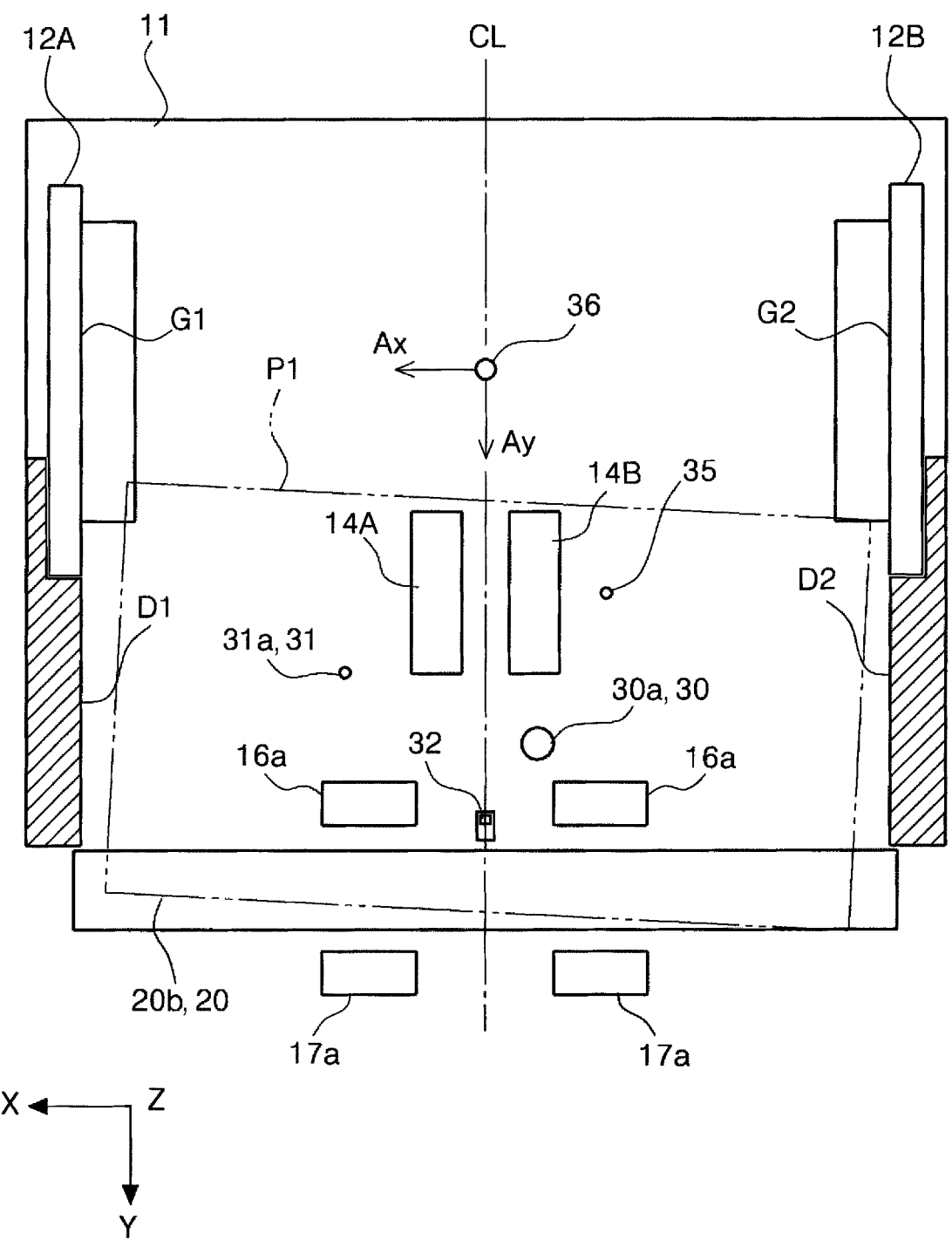
FIG. 5 is a plan view illustrating the document transport path in the scanner.
Figure 6:
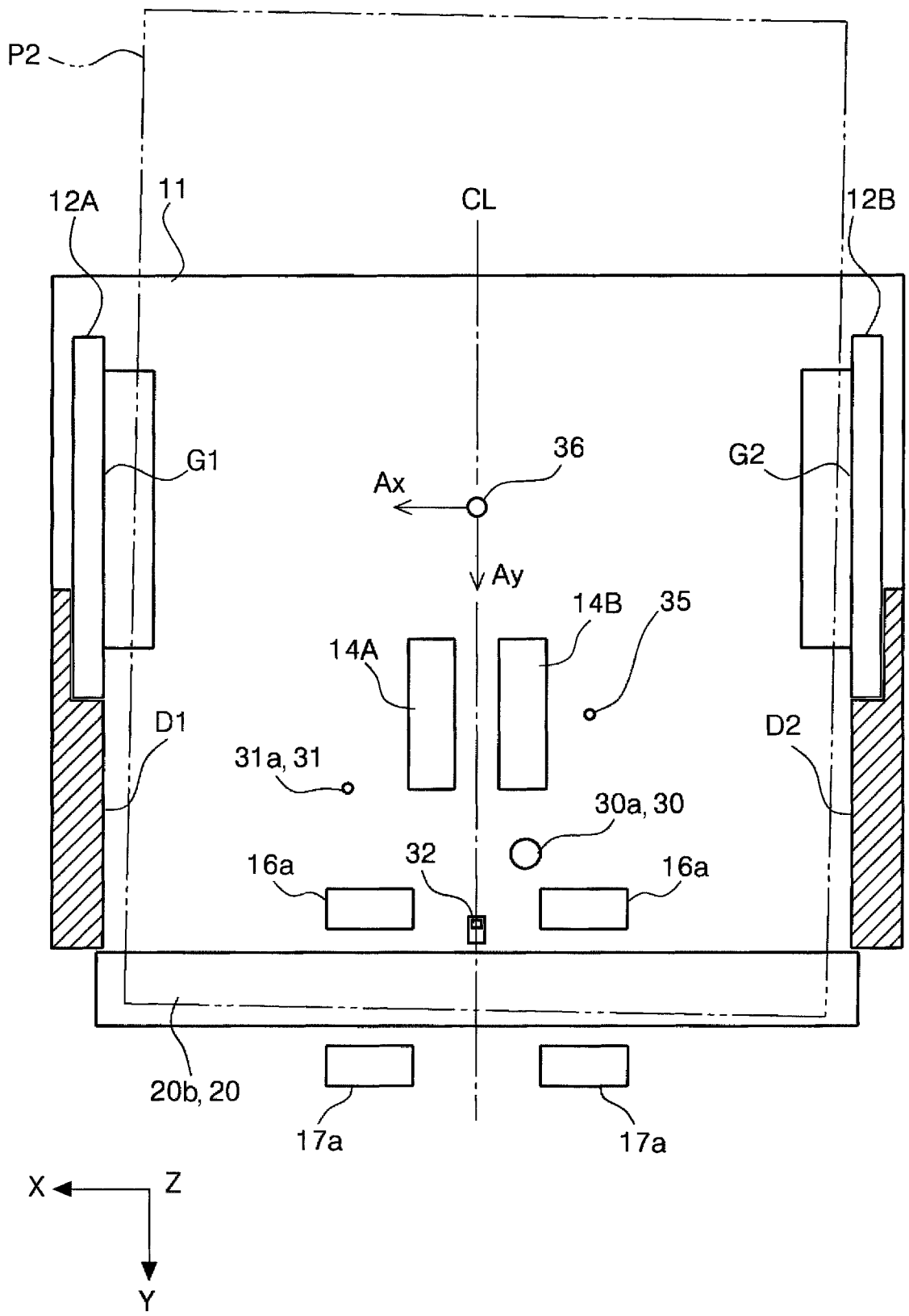
FIG. 6 is a plan view illustrating the document transport path in the scanner.

In the following, a description will be given of a threshold value in step S209 and a tentative threshold value in step S204. First, a description will be given of a basic way of thinking of setting a threshold value with reference to FIG. 5 and FIG. 6. In FIG. 5, the document P1 is an example of documents that are set so as to have a short side along the document feed direction, and an A5 size document is given as an example. Also, in FIG. 6, the document P2 is an example of documents that is set so as to have a long side along the document feed direction, and an A4 size document is given as an example. As illustrated in FIG. 5, when the transport direction length is short, even when a document is transported in a skew state from the state in which the inclination angle of the document top is obtained by the reader 20, the possibility of the occurrence of a jam caused by the document back end having contact with the guide faces G1 and G2 or the guide faces D1 and D2 is lower than that of the document P2 that is long in the transport direction length as illustrated in FIG. 6. Accordingly, in this case, the threshold value of the inclination angle applied to the document P1 illustrated in FIG. 5 is set higher than the threshold value of the inclination angle applied to the document P2 illustrated in FIG. 6.

That is to say, at the time of performing stop control of transport of the document P when the inclination of the document P is higher than a threshold value, a plurality of threshold values are set. The plurality of threshold values have a relationship such that when the document length in the transport direction is a second length which is shorter than a first length, a relatively higher is produced than in a case in which the document length is the first length. The controller 40 selects a threshold value in accordance with the transport direction length of the document P based on the detection value in the second axis Ay direction of the two-dimensional sensor 36. Accordingly, it is possible to avoid stopping transfer even when there is little possibility of causing a transport abnormality and to improve the user convenience.

In this regard, "a threshold value is high" means that a further inclination of the document is permitted. Also, "the plurality of threshold values have a relationship such that when the document length in the transport direction is a second length which is shorter than a first length, a relatively higher is produced than in a case in which the document length is the first length." does not mean that when the document length is short, the threshold value necessarily becomes high, but means that among a plurality of threshold values, two threshold values having the relationship described above ought to exist.

Figure 9:
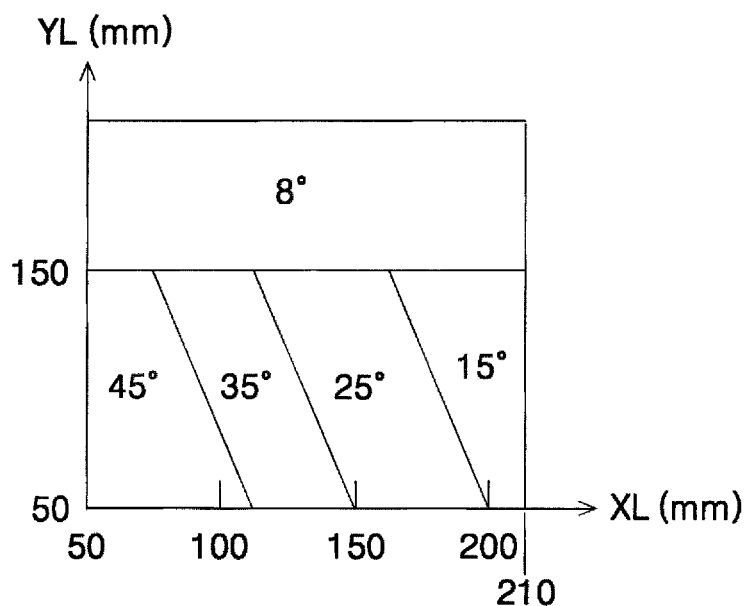
FIG. 9 is a diagram illustrating an example of setting a threshold value with respect to an inclination of the document.

In the following, a description will be given of an example of a specific setting of the threshold value with reference to FIG. 9. In FIG. 9, the vertical axis represents the transport direction length YL (mm) of the document P, and the horizontal axis represents the width direction length XL (mm) of the document P. As illustrated in FIG. 9, when the transport direction length YL is higher than 150 mm, the threshold value becomes 8°. When the transport direction length YL is less than 150 mm, a threshold value higher than a threshold value of 8° is set in accordance with the width direction length XL. Also, when the transport direction length YL is less than 150 mm, even when the width direction length XL is the same, a different threshold value is set in accordance with the transport direction length YL. For example, when the width direction length XL is 100 mm, a threshold value of 35° is set in an area having the transport direction length YL close to 150 mm, and a threshold value of 45° is set in an area having the transport direction length YL close to 50 mm.

Figure 8:
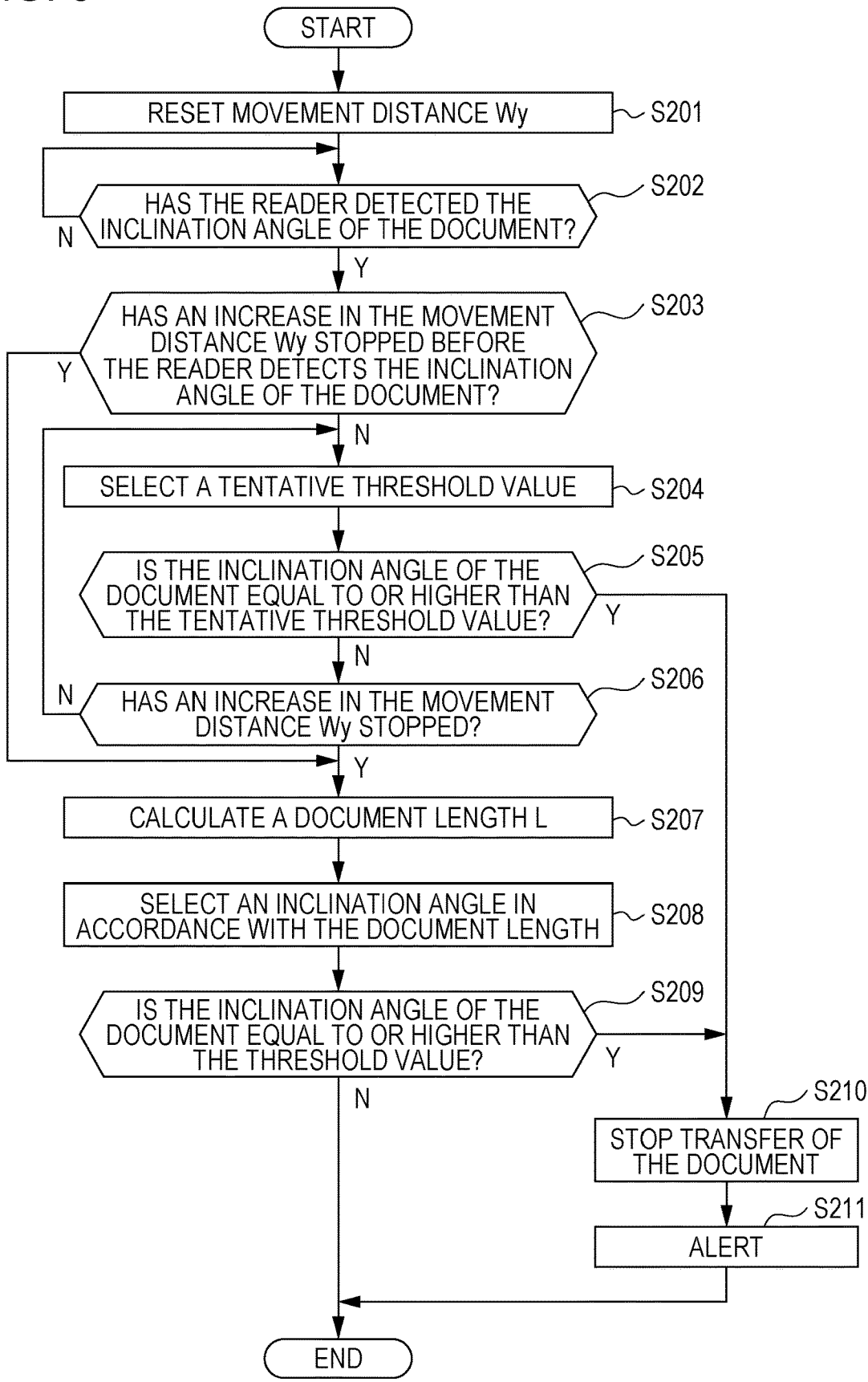
FIG. 8 is a flowchart of abnormality determination processing at the time of scanning a document.

In the processing after the branch result of Yes in step S203 in FIG. 8, the threshold value set in step S208 corresponds to a threshold value of the transport direction length YL of less than 150 mm in FIG. 9. Also, the tentative threshold value set in step S204 in FIG. 8 corresponds to a threshold value of the transport direction length YL of higher than 150 mm in FIG. 9, that is to say, becomes 8°.

Figure 10:
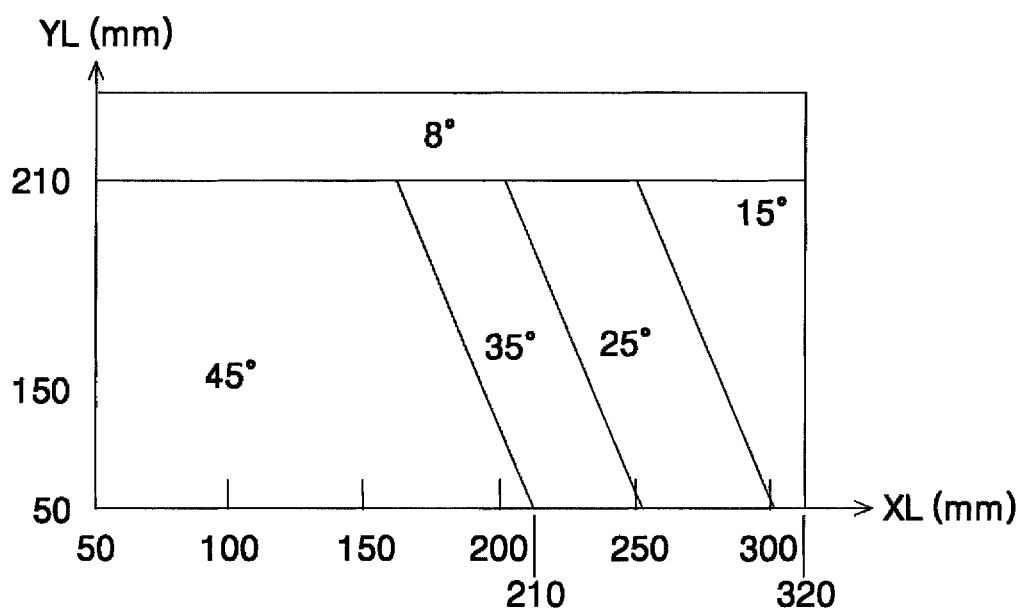
FIG. 10 is a diagram illustrating an example of setting a threshold value with respect to an inclination of the document.

In this regard, the setting of the threshold values in FIG. 9 is an example of the case in which the vertical direction set of a letter size document or an A4 size document is employed as the document P having the largest size assumed in designing the apparatus as described above. On the other hand, when the vertical direction set of an A3 size document is employed as the document P having the largest size assumed in designing the apparatus, the threshold value settings become as illustrated in the FIG. 10. However, the examples of the threshold value settings illustrated in FIG. 9 and FIG. 10 are only examples, and it is needless to say that there are many conceivable other examples of the threshold value settings.

Figure 11:
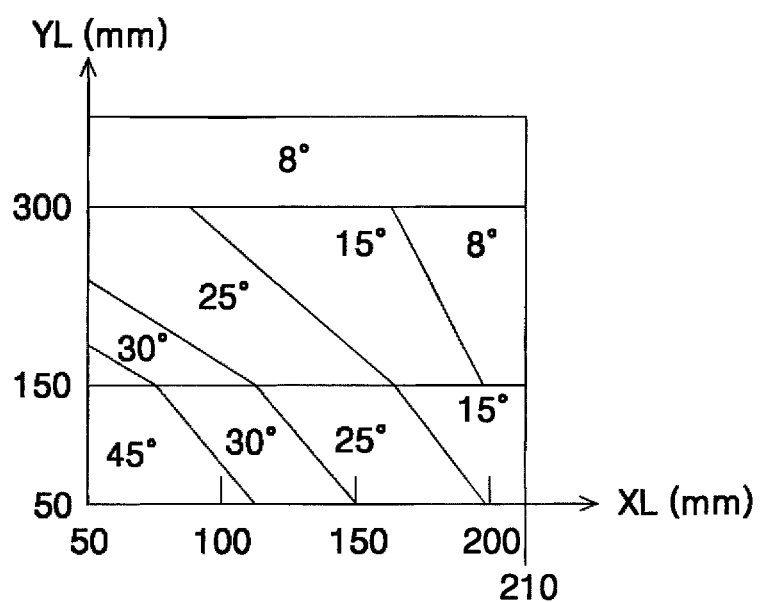
FIG. 11 is a diagram illustrating an example of setting a threshold value with respect to an inclination of the document.

Also, in the examples in FIG. 8 and FIG. 9, only one value is set as a tentative threshold value. However, a lower threshold value may be employed with an increase in the transport direction length YL. FIG. 11 is an example in that case. FIG. 11 is an example in which the vertical set of a letter size or an A4 size document is employed as the document P having the largest size assumed in designing the apparatus. When the transport direction length YL is higher than 150 mm, while the transport direction length YL is less than 300 mm, a threshold value is further set in accordance with the width direction length XL. When the transport direction length YL is higher than 300 mm, a uniform threshold value is set independently of the width direction length XL. However, the example of the threshold value setting illustrated in FIG. 11 is only an example, and it is needless to say that there are many conceivable other examples of the threshold value settings.

When the setting example of a threshold value illustrated in FIG. 11 is used, in the flowchart illustrated in FIG. 8, in the processing repeating steps S204 and S205 after the branch result of No in step S206, the tentative threshold value in step S204 is changed in accordance with the transport direction length YL.

As described above, when the document back end has not passed the detection position by the first document detection section 31 at the time when the document top reaches the detection position by the second document detection section 32, the controller 40 selects a tentative threshold value independent of the document length, and thus it is possible for the controller 40 to determine a transport abnormality in the state of before obtaining the document length in the document transport direction.

Also, a plurality of tentative threshold values are set, and the plurality of tentative threshold values have a relationship of having a higher value when the length in the document width direction is relatively short. Accordingly, it is possible to avoid stopping transfer even when there is little possibility of causing a transport abnormality and to improve the user convenience.

Also, in the embodiment described above, the first detection unit that detects movement in the document transport direction of the document P to be fed downstream by the feed roller 14 includes the two-dimensional sensor 36 that detects the movement of the document P in the two-dimensional coordinate system including the first axis Ax and the second axis Ay. Accordingly, it is possible to suitably detect the movement in the document transport direction of the document P.

It is possible to make the following variations from the embodiment described above.

1. In the above-described embodiment, the description has been given of the case in which the medium transport apparatus is applied to a scanner, which is an example of an image reading apparatus. However, it is possible to apply the technique to a recording apparatus including a recording head that records on the medium, which is represented by a printer.

2. In the above-described embodiment, the two-dimensional sensor 36 is used as the first detection unit that detects movement of the document P, which is fed downstream by the feed roller 14 in the document transport direction. However, the present disclosure is not limited to this. As long as a sensor that detects movement of the document P in the transport direction, any sensor may be used. For example, it is possible to apply a configuration including a roller that is rotated in contact with the document P and an encoder that detects the rotation of the roller.

3. In the above-described embodiment, the second detection unit for detecting the inclination of the document P includes the reader 20, that is to say, a contact-type image sensor module (CISM). However, the present disclosure is not limited to this. For example, a plurality of optical sensors or contact type sensors may be disposed with suitable gaps in the document width direction, and the inclination of the document top may be detected using the difference of detection timings of the document top among the plurality of sensors.

4. In the above-described embodiment, determination of a transport abnormality by two-dimensional sensor 36 may be configured to change between a state to be executed and a state not to be executed depending on a user setting.

5. In the above-described embodiment, the two-dimensional sensor 36 has a controller 36a (FIG. 4). The controller 36a analyzes an image obtained by the image sensor 36d and outputs the movement amount in the first axis Ax direction of the image and the movement amount in the second axis Ay direction to the controller 40 as a detection value (output value). However, the controller 40 may be configured to perform the function of the controller 36a.

6. In the above-described embodiment, the feed roller 14 and the two-dimensional sensor 36 are disposed facing the lowest position sheet of the document P among the sheets of the document P mounted on the document mounting section 11. However, the sensor may be disposed facing the highest position sheet of the document P among the sheets of the document P mounted on the document mounting section 11.

7. In the above-described embodiment, each threshold values is a value set in advance. However, it may be possible to have a configuration in which a threshold value is calculated each time based on the preset calculation expression.

What is claimed is:

1. A medium transport apparatus comprising:
   a feed unit configured to feed a medium to a transport direction;
   a first detection unit disposed upstream of the feed unit and facing a face of the medium to be transported to the transport direction, and configured to detect movement of the medium to be fed downstream by the feed unit;
   a second detection unit disposed downstream of the first detection unit and configured to detect an inclination of the medium; and
   a control unit configured to detect the inclination of the medium based on a signal received from the second detection unit and stop transfer of the medium when the inclination exceeds one of a plurality of threshold values,
   wherein the plurality of the threshold values have a relationship such that a first threshold of the plurality of thresholds is set by a length of a first medium in the transport direction determined by the first detection unit and when a second length of another medium in the transport direction determined by the first detection unit is shorter than a first length, a threshold of the other medium is set to be relatively higher value than the first threshold, and the control unit selects any one of the plurality of threshold values based on a detection value of the first detection unit that determines the length of the medium in the transport direction.

2. The medium transport apparatus according to claim 1, wherein when the second detection unit detects an inclination of a medium front end, in a case in which a medium back end has not passed a detection position by the first detection unit, the control unit selects a tentative threshold value independent of the medium length.

3. The medium transport apparatus according to claim 2, wherein a plurality of the tentative threshold values are set, and the plurality of the tentative threshold values have a relationship such that a higher value is produced when the medium length in a width direction intersecting the transport direction is relatively short.

4. The medium transport apparatus according to claim 1, wherein the first detection unit is a two-dimensional sensor that detects movement of the medium in a two-dimensional coordinate system including a first axis and a second axis.

5. An image reading apparatus comprising:

a reading unit configured to read a medium; and the medium transport apparatus configured to transport the medium to the reading unit, according to claim 1.

6. A method of controlling a medium transport apparatus including a feed unit configured to feed a medium to a transport direction, a first detection unit disposed upstream of the feed unit and facing a face of the medium to be transported to the transport direction, and configured to detect movement of the medium to be fed downstream by the feed unit, and a second detection unit disposed downstream of the first detection unit and configured to detect an inclination of the medium, the method comprising:

a plurality of the threshold values being set for an inclination of the medium, and the plurality of the threshold values have a relationship such that a first threshold of the plurality of thresholds is set by a length of a first medium in the transport direction determined by the first detection unit and when a second length of another medium in the transport direction determined by the first detection unit is shorter than a first length, a threshold of the other medium is set to be relatively higher value than the first threshold, and selecting any one of the plurality of threshold values based on a detection value of the first detection unit that determines the length of the medium in the transport direction;

detecting an inclination of the medium based on a signal received from the second detection unit; and when the inclination exceeds one of the plurality of threshold values, stopping transfer of the medium.

\* \* \* \* \*